United States Patent [19]

Kendall

[11] Patent Number: 5,430,857
[45] Date of Patent: Jul. 4, 1995

[54] METHOD AND APPARATUS FOR TRANSLATING LOGICAL ADDRESSES INTO PHYSICAL ADDRESSES USING ODD/EVEN TRANSLATION TABLES

[75] Inventor: Terry L. Kendall, Placerville, Calif.
[73] Assignee: Intel Corporation, Santa Clara, Calif.
[21] Appl. No.: 246
[22] Filed: Jan. 4, 1993
[51] Int. Cl.6 .............................................. G06F 12/10
[52] U.S. Cl. .............................. 395/400; 364/DIG. 1
[58] Field of Search ................................. 395/400, 425

[56] References Cited

U.S. PATENT DOCUMENTS

| | | | |
|---|---|---|---|
| 3,825,904 | 7/1974 | Burk et al. | 395/400 |
| 4,646,237 | 2/1987 | Allen | 395/425 |
| 4,654,777 | 3/1987 | Nakamura | 395/400 |
| 4,691,281 | 9/1987 | Furui | 395/400 |
| 4,695,943 | 9/1987 | Keeley et al. | 395/425 |
| 4,736,293 | 4/1988 | Patrick | 395/425 |
| 4,785,395 | 11/1988 | Keeley | 395/425 |
| 4,799,222 | 1/1989 | Barlow et al. | 395/425 X |
| 4,803,621 | 2/1989 | Kelly | 395/425 |

*Primary Examiner*—Jack B. Harvey
*Assistant Examiner*—Michael A. Whitfield
*Attorney, Agent, or Firm*—Blakely, Sokoloff, Taylor & Zafman

[57] ABSTRACT

A method of addressing units of data stored in a memory using logical addresses. The logical addresses include fewer bits than necessary to uniquely address each unit of data stored in the memory. Translation of a logical address begins with analysis of a first logical address associated with a first unit of data to determine whether it is an even logical address or an odd logical address. A number of similar steps are taken in either case. If the first logical address is an even logical address these steps include coupling the first number of bits to an even translation table. The even translation table stores an even pointer for each even logical address. Each even pointer includes fewer bits than necessary to uniquely identify each unit of data stored in the memory. The even translation table couples the pointer to a first memory, which stores units of data associated with even logical addresses. Finally, in response to the even pointer a first unit of data is output from the even memory. On the other hand, if the first logical address is an odd logical address then the first logical address is coupled to an odd translation table. The odd translation table stores an odd pointer for each odd logical address. Like the even pointers, each odd pointer includes fewer bits than necessary to uniquely identify each unit of data stored in the memory array. In response to the first logical address, the odd translation table couples a second odd pointer to an odd memory, which stores units of data associated with odd logical addresses. The odd memory then outputs the first unit of data associated with the first logical address.

6 Claims, 5 Drawing Sheets

METHOD AND APPARATUS FOR TRANSLATING LOGICAL ADDRESSES INTO PHYSICAL ADDRESSES USING ODD/EVEN TRANSLATION TABLES

FIELD OF THE INVENTION

The present invention relates to memory storage systems. More particularly, the present invention pertains to a method and apparatus for addressing data stored in a memory given a logical address.

BACKGROUND OF THE INVENTION

Many prior memory storage units are realized using solid state media such as dynamic random access memories (DRAMs), static random access memories (SRAMs), read only memories (ROMs), programmable read only memories (PROMs), erasable programmable read only memories (EPROMs) and electrically erasable programmable read only memories (EEPROMs). As the capacity of solid state memory storage units increases, the number of bits required to uniquely address each memory location also increases.

Many prior computer systems mitigate this problem by manipulating pointers to physical addresses rather than the physical addresses themselves. These pointers are typically represented using fewer bits than the physical addresses themselves. However, once the value represented by the pointer must be read the pointer must be converted to a physical address. One typical means of converting a pointer, or logical address, to a physical address is a translation table. A translation table stores a physical address for each pointer. The required width of a translation table increases as the number of bits required to uniquely address each memory location increases. The width of a translation table is a particular concern when it is to be realized using commercially available solid state memory devices and cost is an issue. Many commercially available memories are byte wide, that is they store data in 8 bit units. Consequently, some amount of memory is wasted when the number of bits of a physical address is not a multiple of eight.

SUMMARY OF THE INVENTION

A method of addressing units of data stored in a memory using logical addresses is described. The logical addresses include fewer bits than necessary to uniquely address each unit of data stored in the memory. Translation of a logical address begins with analysis of a first logical address associated with a first unit of data to determine whether it is an even logical address or an odd logical address. A number of similar steps are taken in either case. If the first logical address is an even logical address these steps include coupling the first number of bits to an even translation table. The even translation table stores an even pointer for each even logical address. Each even pointer includes fewer bits than necessary to uniquely identify each unit of data stored in the memory. The even translation table couples the pointer to a first memory, which stores units of data associated with even logical addresses. Finally, in response to the even pointer a first unit of data is output from the even memory. On the other hand, if the first logical address is an odd logical address then the first logical address is coupled to an odd translation table. The odd translation stores an odd pointer for each odd logical address. Like the even pointers, each odd pointer includes fewer bits than necessary to uniquely identify each unit of data stored in the memory array. In response to the first logical address, the odd translation table couples a second odd pointer to an odd memory, which store units of data associated with odd logical addresses. The odd memory then outputs the first unit of data associated with the first logical address.

Other objects, features, and advantages of the present invention will be apparent from the accompanying drawings and the detailed description that follows.

BRIEF DESCRIPTION OF THE FIGURES

The present invention is illustrated by way of example and not limitation in the figures of the accompanying drawings in which references indicate similar elements and in which.

DETAILED DESCRIPTION

Figure 1:
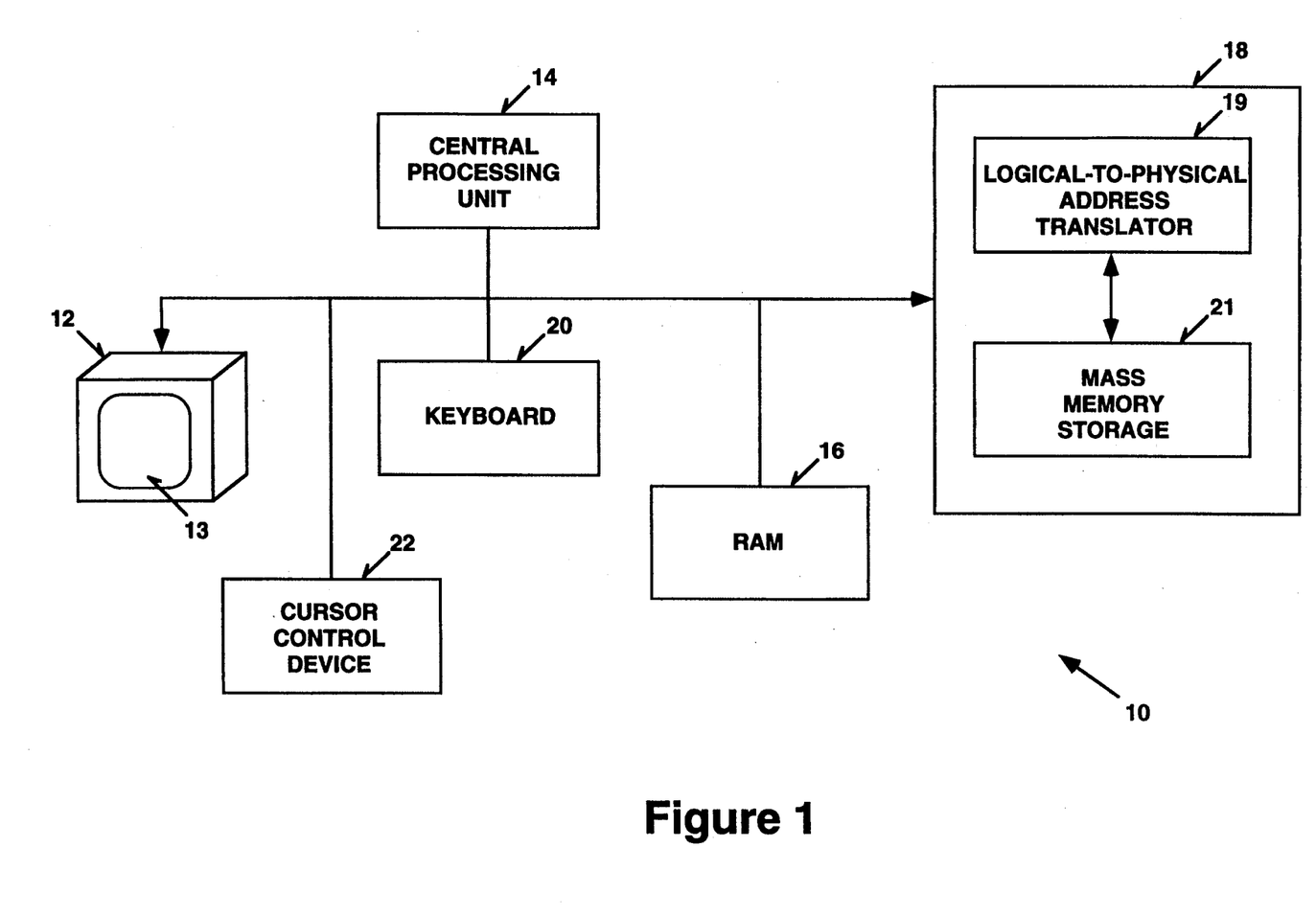
FIG. 1 is a block diagram of a computer system.

FIG. 1 illustrates a computer system 10 in which the present invention operates. Briefly described, the present invention provides a means for translating logical addresses to physical addresses.

Computer system 10 includes a monitor 12 for visually displaying information to a computer user and a central processing unit (CPU) 14. Computer system 10 includes both short term, easily accessible memory, such as random access memory (RAM) 16, and long term, mass storage memory 18. Keyboard 20 allows a computer user to provide input to CPU 14. Computer system 10 also includes a cursor control device 22, such as a mouse, trackball, joystick, or special keys capable of signaling movement in a particular direction. By moving cursor control device 22 the computer user is able to control the movement of the two or three dimensional movement of a visible symbol, such as a cursor 13, displayed via monitor 12.

Mass storage memory 18 includes the logical to physical address translator (LPAT) 19 of the present invention and mass memory 21. Mass memory 21 is realized as an array, or multiplicity, of solid state memory devices. Logical to physical address translator 19 receives logical address signals from CPU 14, translates these signals to physical addresses, and couples the physical addresses to mass memory 21.

Figure 2:
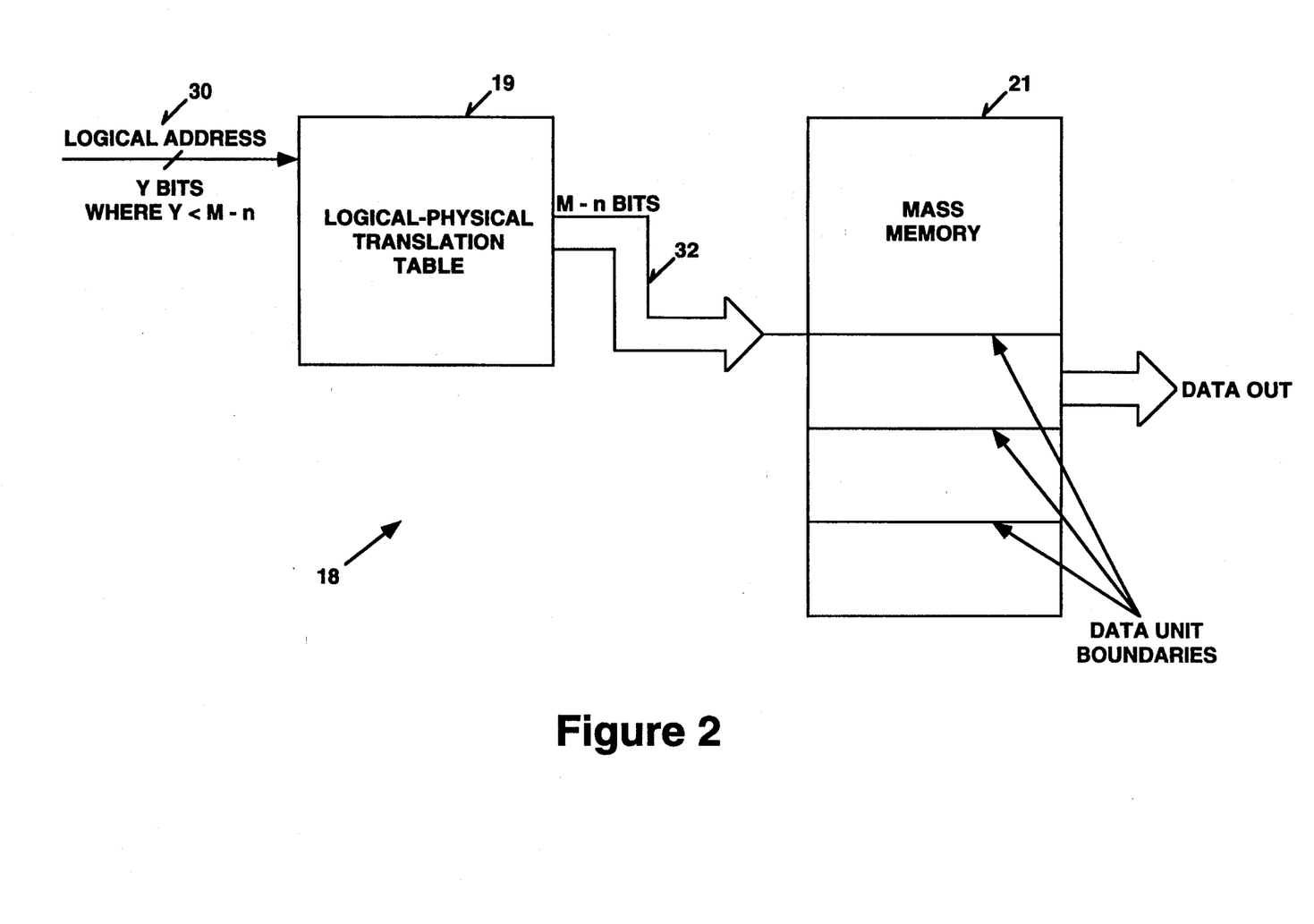
FIG. 2 is a block diagram of a circuit for translating logical addresses to physical addresses.

FIG. 2 illustrates one embodiment of mass storage memory 18 and LPAT 19. Data within mass storage memory 18 is read and written in units. Each unit of data includes a constant number, C, of words of data, where C is greater than one. As used herein, a "word of data" is defined as the set of data bits stored in one memory location of mass memory 21. It follows that a data unit includes multiple data words and is stored in multiple memory locations.

Logical to physical address translator 19 is realized as a logical-to-physical translation table 19a, which is stored in a solid state memory, such as RAM. A logical address 30 for a data unit functions as an address, or pointer, into logical to physical translation table 19a.

Logical address 30 includes fewer bits than necessary to uniquely address a word of data stored within mass memory 21. Stated another way, if the number of bits required to uniquely address each memory location within mass memory 21 is M, and if the number of bits within logical address 30 is Y, then $Y<M$. In response to logical address 30, logical to physical translation table 19a outputs a pointer signal 32, which is coupled to mass memory 21. Pointer signal 32 uniquely identifies and locates a unit of data stored within mass memory 21 by providing an offset with respect to an arbitrarily chosen and constant memory location, such as the "top" of mass memory 21. As each unit of data includes multiple data words, the number of bits within pointer signal 32 is less than the number of bits necessary to uniquely identify each word of data stored within mass memory 21. In other words, if the number of bits included in pointer signal 32 is $M-n$, then $M-n<M$.

Storing pointers for data units, rather than physical addresses for memory locations, reduces the width of logical to physical translation table 19a. For example, if mass memory 21 includes 131,072 memory locations, uniquely addressing them would require 17 bits. If mass memory 21 stores 256 data units, then logical to physical translation table 19a need only be 8 bits wide to uniquely identify the location of all 256 data units with respect to a reference location.

Figure 3:
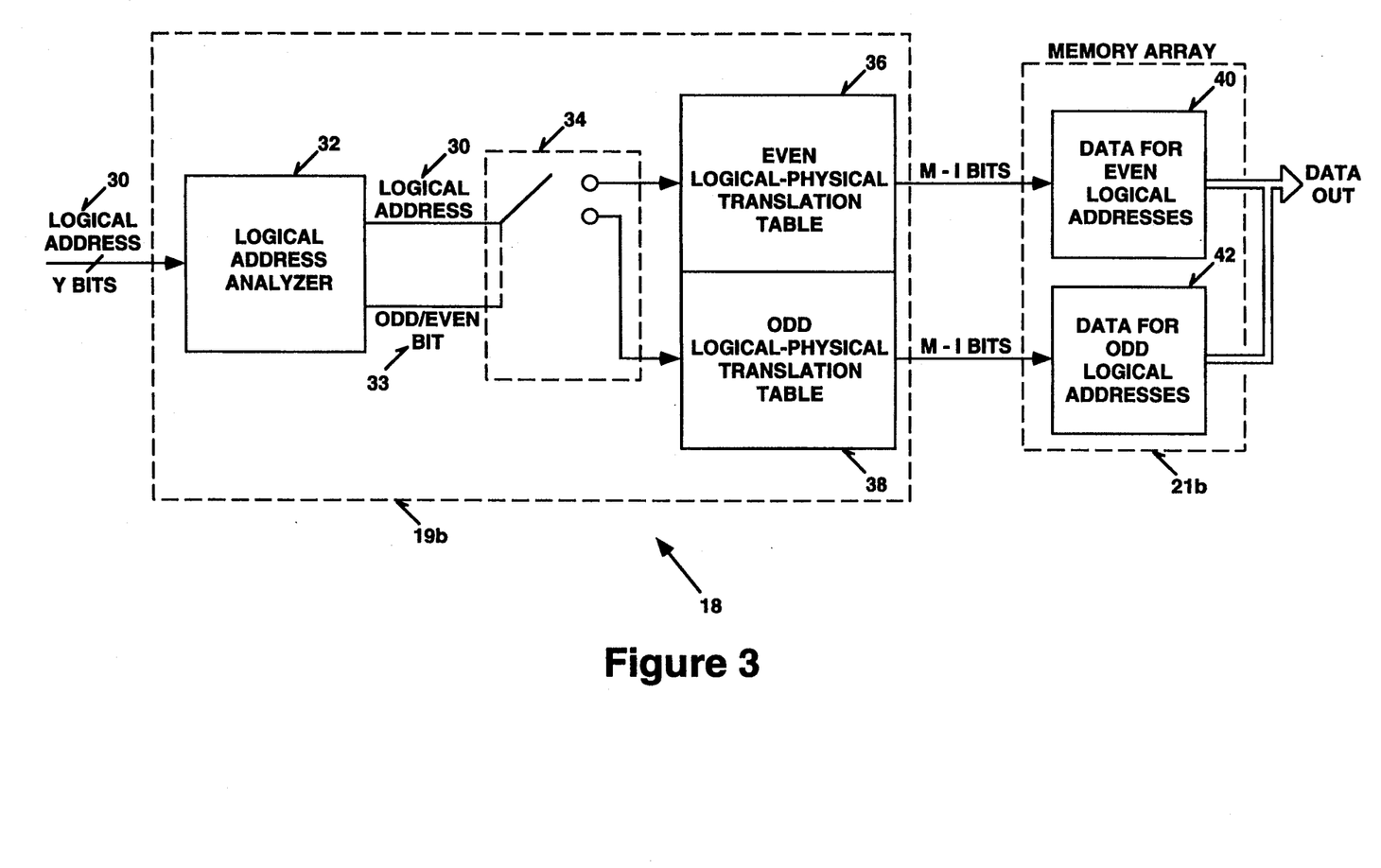
FIG. 3 is a block diagram of a second circuit for translating logical addresses to physical addresses.

FIG. 3 illustrates a second LPAT 19b and mass memory 21b. LPAT 19b is particularly useful for systems in which the size of data units is not constant because of data compression or the size of a data unit is a single word.

LPAT 19b includes logical address analyzer 32, which analyzes a single bit of logical address 30 to determine whether logical address 30 is odd or even. The particular bit chosen for analysis from among the Y bits does not matter, so long as the same bit is analyzed each time. In response, logical address analyzer 32 outputs odd/even bit 33, which controls switch 34. Switch 34 couples logical address 30 to one of the two translation tables 36 or 38 depending upon the state of odd/even bit 33. Logical address 30 is coupled to even logical to physical translation table 36 if odd/even bit 33 represents an even logical address. Analogously, switch 34 couples logical address 30 to odd logical translation table 38 if odd/even bit 30 represents an odd logical address.

Both logical address analyzer 32 and switch 34 may be realized in a number of ways known to those skilled in the art. Consequently, means of realizing both logical address analyzer 32 and switch 34 will not be described in detail herein.

Both even logical to physical translation table 36 and odd logical to physical translation table 38 store a physical address for each logical address 30. The physical addresses stored in both tables include M-1 bits, where M represents the number of bits necessary to uniquely address each memory location within mass memory 21b. $M-1$ bits are sufficient to uniquely address each memory location because mass memory 21b is divided into two memory areas. One memory area 40 stores data associated with even logical addresses, while the other memory area 42 stores data associated with odd logical addresses. This segregation of data reduces by one the number of bits necessary to uniquely address each memory location within mass memory 21b.

Translation tables 36 and 38 may be realized using RAM, FLASH electrically erasable programmable read only memory (EEPROM), or other solid state memory devices.

Figure 4:
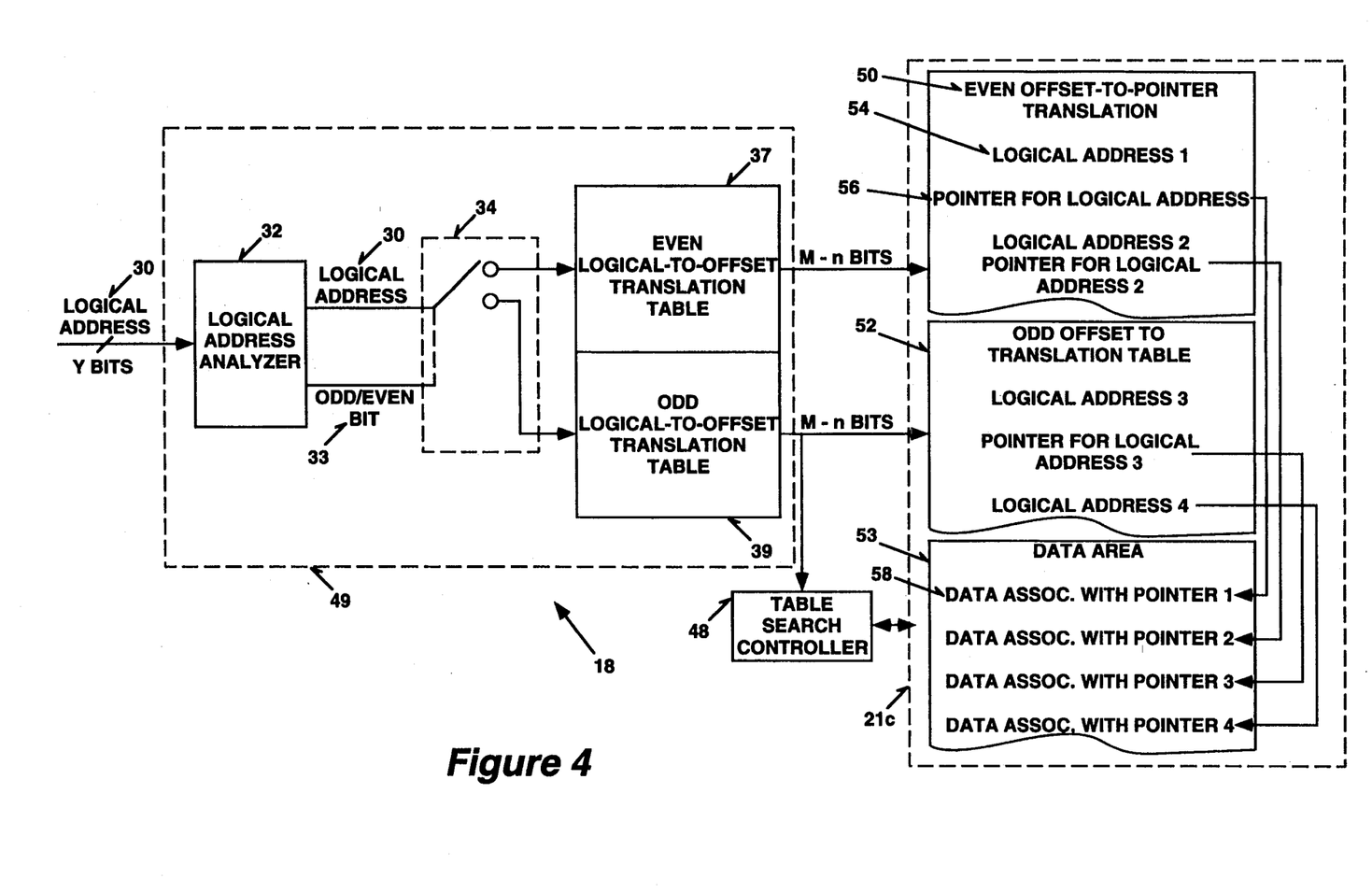
FIG. 4 is a block diagram of a third circuit for translating logical addresses to physical addresses.

FIG. 4 illustrates a third mass storage memory 18, which includes an alternate embodiment that includes offset translation table 49 and mass memory 21c. Offset translation table 49 is organized much like logical to physical translator 19b of FIG. 3. That is to say, offset translation table 49 includes logical address analyzer 32, switch 34, and two translation tables 37 and 39. Translation tables 37 and 39 differ from previously discussed translation tables 36 and 38 in that they do not store pointers that uniquely locate a unit of data associated with a logical address. Let us call the pointers stored in translation tables 37 and 39 "offsets." The offsets stored within translation tables 37 and 39 point near another pointer within mass memory 21c for the data unit associated with a logical address. As a result, the same offset may be stored in translation table 37 for multiple logical addresses. Using the same offset for multiple logical addresses reduces the necessary width of translation tables 37 and 39. The actual reduction in width of translation tables 37 and 39 depends on a variety of factors, including the number of bits M required to uniquely address each memory location, and the desired response time of mass storage memory 18. Response time will increase as the number of logical addresses sharing the same pointer increases.

The change in the number of bits stored by translation tables 37 and 39 necessitates a change in the organization of mass memory 21. This change in mass memory 21 in turn requires,some means,of searching mass memory 21c. Table search controller 48 serves this purpose by searching for logical addresses within mass memory 21c matching the desired logical address output by logical to physical translator 19c. Table search controller 48 may also perform other functions. Table search controller 48 may be implemented in hardware or software, as desired. Table search controller 48 will not be described in detail herein.

Mass memory 21c includes two translation tables also: even offset to pointer translation table 50 and odd offset to pointer translation table 52. Each offset to pointer translation table 50 and 52 includes two pieces of information for each logical address: a logical address identifier and a pointer to the location of the unit of data associated with that particular logical address. Including a logical address identifier allows table search controller 48 to identify the desired pointer. For example, even offset to pointer translation table 50 includes logical address 1 54 and pointer for logical address 1 56. Pointer 56 points to the location of data unit 53 within data area 53. To reduce their width, translation tables 50 and 52 need not store physical addresses. Rather, translation tables 50 and 52 could store an offset from a known, constant, and arbitrarily chosen memory location.

Mass memory 21c may be realized using an array of solid state memory devices. The data space of each memory device may be divided into an offset to pointer translation table and data space. Preferably the number of data units stored in any particular memory device is set to a fixed number. Limiting the number of data units stored in any particular memory device allows control of the maximum number of logical addresses within an offset to pointer translation table 50 or 52 that must be examined to locate a desired unit of data. Fixing the maximum number of data units stored within a memory device also permits control of the maximum seek time required to locate a unit of data given an offset from table 37 or 39. For example, suppose that each memory device stores no more than 2048 units of data and that 256 offsets are available for each memory device. As a result, no more than 8 logical addresses within any offset to pointer translation table 50 or 52 would have to be examined to locate the desired pointer and its associated unit of data.

The maximum number of offsets used in conjunction with each offset to pointer translation table 50 and 52 directly effects the width of translation tables 37 and 39. The larger the number of offsets used the wider translation tables 37 and 39 must be. Simultaneously, the number of logical addresses that must be searched within an offset to pointer translation table 50 or 52 decreases as the number of offsets used increases.

Figure 5:
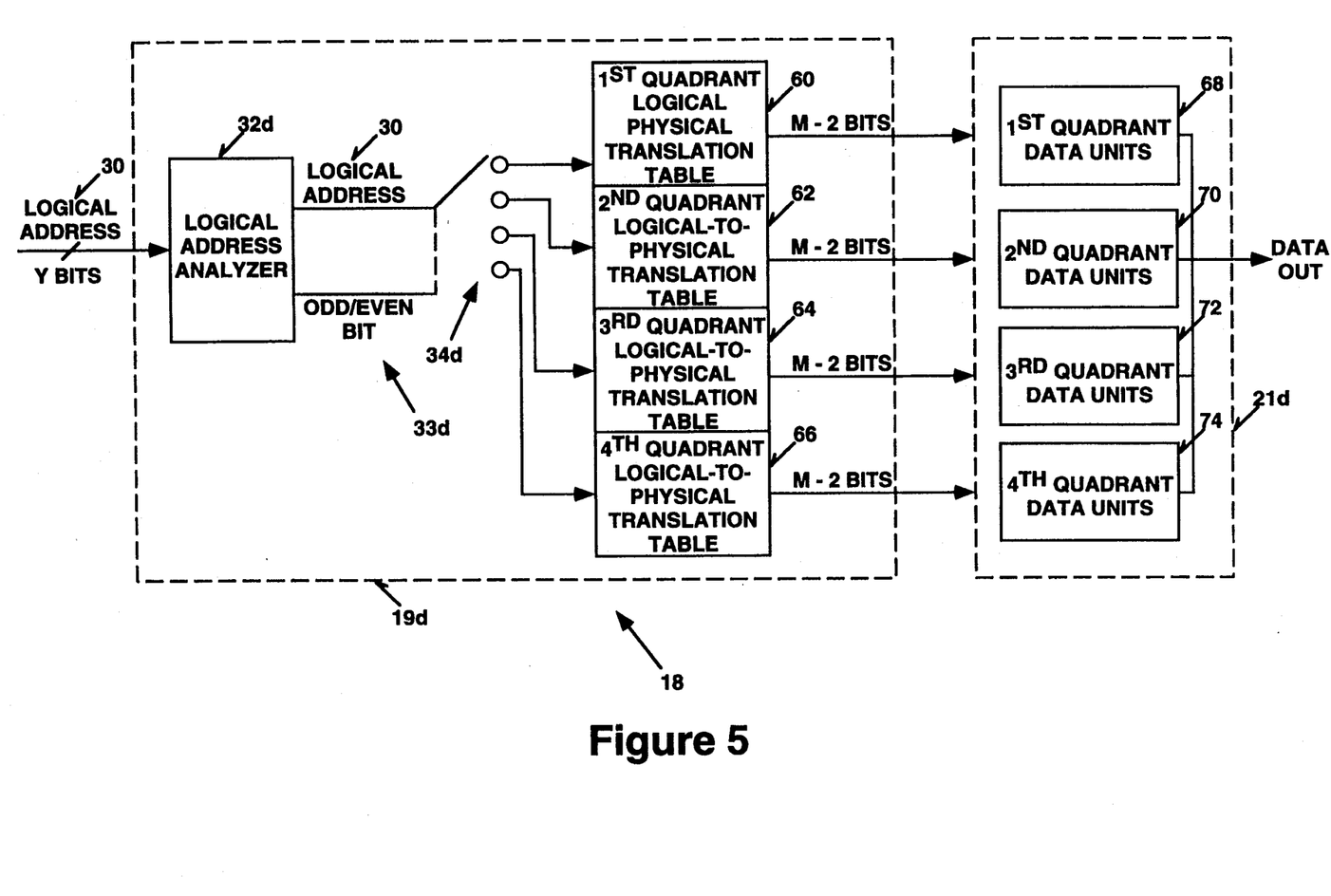
FIG. 5 is a block diagram of a fourth circuit for translating logical addresses to physical addresses.

FIG. 5 illustrates mass storage memory 18, which includes a fourth logical to physical translator 19d. Logical to physical translator 19d is an extension of logical to physical translator 19b of FIG. 2. The number of bits that must be stored to uniquely address each memory location within mass memory 21 is reduced by two by dividing logical to physical translator 19d and mass memory 21d into four quadrants.

Logical address analyzer 32d analyzes two bits of logical address 30 to determine which quadrant logical address 30 belongs. The particular bits chosen for analysis from among the Y bits does not matter, so long as the same bits are analyzed each time. Logical address analyzer 32d outputs two quadrant bits, which control switch 34d. Switch 34 couples logical address 30 to one of the four translation tables 60, 62, 64, or 66 depending upon the state of the two bits 33d. For example, logical address 30 is coupled to first quadrant logical to physical translation table 60 if the two quadrant bits represent the first quadrant.

Both logical address analyzer 32d and switch 34d may be realized in a number of ways known to those skilled in the art. Consequently, means of realizing both logical address analyzer 32d and switch 34d will not be described in detail herein.

All four quadrant logical to physical translation tables 60, 62, 64 and 66 store a physical address for each logical address 30. The physical addresses stored in these translation tables 60, 62, 64, and 66 include M−2 bits, where M represents the number of bits necessary to uniquely address each memory location within mass memory 21d. M−2 bits are sufficient to uniquely address each memory location because mass memory 21d is divided into four memory areas. Each memory area 68, 70, 72, and 74 stores data units associated with logical addresses associated with a single quadrant. This segregation of data reduces by two the number of bits necessary to uniquely address each memory location within mass memory 21d.

Translation tables 60, 62, 64, and 66 may be realized using RAM, FLASH electrically erasable programmable read only memory (EEPROM), or other solid state memory devices.

The length of logical to physical translator 19 may also be reduced by implementing any of the previously described translation tables as a most recently used cache memory.

Thus, logical to physical address translators have been described that reduce the number of bits that must be stored to retrieve data from mass storage memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. Addressing circuitry for accessing an M bit address with M−1 bits, comprising:
   a memory including a first portion, a second portion, and a data area, each portion of the memory including memory address data,
   a table of addresses comprising a first portion and a second portion, each entry of the table including a table address having M−1 bits and representing M bits, each portion of the table corresponding to one portion of the memory;
   an address analyzer which analyzes a predetermined bit of an M-bit input address, the input address including the predetermined bit and M−1 other bits;
   a switch for selecting a selected table portion from one of the portions of the table in accordance with an output of the address analyzer, wherein the selected table portion provides an offset associated with the table address matching the M−1 other bits of the input address, wherein the offset points to an initial location in a selected portion of the memory in accordance with the value of the predetermined bit;
   a table search controller for searching the memory address data in the selected portion of the memory starting at the initial location for a logical address that matches at least a portion of the input address.

2. The circuitry as set forth in claim 1, wherein said memory address data further comprises memory address data pointers, each memory address data pointer associated with one logical address, each of said memory address data pointers pointing to data located in the data area of the memory.

3. The circuitry as set forth in claim 1, wherein the table is a cache memory.

4. Addressing circuitry for accessing a P-bit address with P-Q bits, comprising:
   a memory, wherein the memory has no more than $2^P$ memory locations containing data, wherein the memory is divided into N portions and a data area, wherein N is no more than $2^Q$ and N is greater than $2^{Q-1}$, wherein each of the N portions includes memory address data;
   a table of addresses comprising N portions, each entry of the table including a table address having P-Q bits and representing P bits, each portion of the table corresponding to one portion of the memory;
   an address analyzer which analyzes Q predetermined bits of a P-bit input address, the input address including the Q predetermined bits and P-Q other bits;
   a switch for selecting a selected table portion from one of the N portions of the table in accordance with an output of the address analyzer, wherein the selected table portion provides an offset associated with the table address that matches the P-Q other bits of the input address, wherein the offset points to an initial location in a selected portion of the memory;

a table search controller for searching the memory address data in the selected portion of the memory starting at the initial location for a logical address that matches at least a portion of the input address.

5. The circuitry as set forth in claim 4, wherein said memory address data further comprises memory address data pointers, each memory address data pointer associated with one logical address, each of said memory address data pointers pointing to data located in the data area.

6. The circuitry as set forth in claim 5, wherein said table is a cache memory.

* * * * *

UNITED STATES PATENT AND TRADEMARK OFFICE
CERTIFICATE OF CORRECTION

PATENT NO.    :   5,430,857
DATED         :   July 4, 1995
INVENTOR(S)   :   Terry L. Kendall It is certified that error appears in the above-identified patent and that said Letters Patent is hereby corrected as shown below:

In column 4 at line 31 delete "requires,some means," and insert --requires some means--

In column 8 at line 4 delete "claim 5," and insert --claim 4,--

Signed and Sealed this

Third Day of December, 1996

Attest:

BRUCE LEHMAN

Attesting Officer      Commissioner of Patents and Trademarks